United States Patent [19]

Gournay et al.

[11] 4,132,943

[45] Jan. 2, 1979

[54] REMOTE SENSING OF HYDROCARBON GAS SEEPS UTILIZING MICROWAVE ENERGY

[75] Inventors: Luke S. Gournay, Rockwall; John W. Harrell, Duncanville; Charles L. Dennis, Dallas, all of Tex.

[73] Assignee: Mobile Oil Corporation, New York, N.Y.

[21] Appl. No.: 788,394

[22] Filed: Apr. 18, 1977

[51] Int. Cl.² .............................................. G01V 3/12
[52] U.S. Cl. ..................................... 324/6; 324/58.5 B
[58] Field of Search .......... 324/6, 58 R, 58 B, 58.5 B; 340/237 R, 258 B; 73/40

[56] References Cited

U.S. PATENT DOCUMENTS

| | | | |
|---|---|---|---|
| 3,651,395 | 3/1972 | Owen et al. | 324/6 |
| 3,665,466 | 5/1972 | Hibbard | 324/6 X |
| 3,803,595 | 4/1974 | McMillan | 324/6 UX |
| 3,836,960 | 9/1974 | Gehman et al. | 324/6 X |

Primary Examiner—Gerard R. Strecker
Attorney, Agent, or Firm—C. A. Huggett; George W. Hager, Jr.

[57] ABSTRACT

A radar transmitter directs a beam of microwve energy at a first frequency through the atmosphere. A gas seep in the atmosphere irradiated by the beam of microwave energy is excited to emit microwave energy at a second frequency characteristic of the particular species of gas. A radar receiver is tuned to produce video signals representative of the microwave energy at the second frequency. An amplitude discriminator measures the amplitudes of the video signals during each radar sweep as an indication of gas concentration in the seeps and counts the number of video signals during each radar seep as an indication of the size of the seeps.

10 Claims, 6 Drawing Figures

4,132,943

REMOTE SENSING OF HYDROCARBON GAS SEEPS UTILIZING MICROWAVE ENERGY

BACKGROUND OF THE INVENTION

This invention relates to the remote sensing of a gas in the atmosphere employing a radar transmitter for exciting the gas with microwave energy and a radar receiver for detecting microwave energy emitted by the excited gas. More particularly, gas seeps from subsurface formations are identified as to size and concentration as an indication of the possible presence of subsurface hydrocarbon-bearing formations.

Various sources emit different species of gases. Aircraft, automobiles, and other type motor vehicles emit gasoline and fuel oil vapors into the atmosphere. Commercial and industrial users of fuel emit gaseous pollutants or contaminants into the atmosphere. Storage facilities and pipelines to and from such facilities may be leaking gases into the atmosphere. Subsurface geological structures containing hydrocarbon deposits may be fractured or faulted, thereby permitting hydrocarbon gas to seep into the atmosphere.

Several different methods and systems have been developed for locating various species of gases in the atmosphere. One such method and system employs a remote sensing technique wherein a radar transmitter emits a beam of electromagnetic energy at a microwave frequency. The molecules of certain species of gases that might be found in the atmosphere are irradiated by the beam of microwave electromagnetic energy. This irradiation excites the gas molecules to new molecular rotation states from which they emit electromagnetic energy at characteristic molecular resonance frequencies. This electromagnetic energy emitted by the gases is detected by the radar receiver and correlated with known molecular resonance frequencies for certain species of gases to identify the particular species of gas that has been irradiated by the electromagnetic energy from the radar transmitter.

Molecular configurations of certain species of gases are inherently associated with specific molecular resonance frequencies in the microwave energy spectrum. At temperatures above absolute zero, the molecules rotate about some axis defined within the molecule. The molecules are not free to rotate at any arbitrary rate but take on rotations at only certain unique and particular rates. Rotational energy of molecules therefore depends upon the particular rotational-energy state of the molecules. At thermal equilibrium, molecules of a particular species of gas will not all exist at the same rotational-energy state. If the configuration of a molecule is such that its average electrical charge is asymmetrically distributed, it is said to possess an electric dipole moment. Only those molecules having such a dipole moment can change their rotational-energy states through interaction with an incident electromagnetic field. Certain species of gases exhibit such molecular configuration and can therefore interact and exchange rotational energy with an incident electromagnetic field. However, each of such species has its own unique set of possible interaction rotational rates. By knowing such rates for a particular species, electromagnetic energy can be radiated toward and absorbed by the gas in the form of increased rotational energy. A particular species of gas can therefore be detected in a remote sensing operation by employing a radar transmitter at microwave frequencies to excite the gas molecules to new rotational-energy states and a radar receiver to detect the resulting electromagnetic radiation emitted by the excited gas molecules at their characteristic molecular resonance frequencies in the microwave energy spectrum.

SUMMARY OF THE INVENTION

In accordance with the present invention, gas seeps in the atmosphere are located by microwave remote sensing. Microwave energy is repetitively transmitted at a first frequency into the atmosphere through a given radiation pattern. This microwave energy excites gas seeps located within the radiation pattern to emit microwave energy at a second frequency characteristic of a molecular resonance of the particular species of gas. The microwave energy at this second frequency is received and video signals representing such detected microwave energy are produced. The average amplitude of all the video signals produced for each microwave energy transmission is determined. Also, a count of the number of video signals produced for each microwave energy transmission is determined. Such determinations of average amplitude and number of the video signals are recorded as indications of the concentration and sizes, respectively, of gas seeps located with the radiation pattern of the microwave energy transmission.

DETAILED DESCRIPTION OF THE PREFERRED EMBODIMENT

Figure 1:
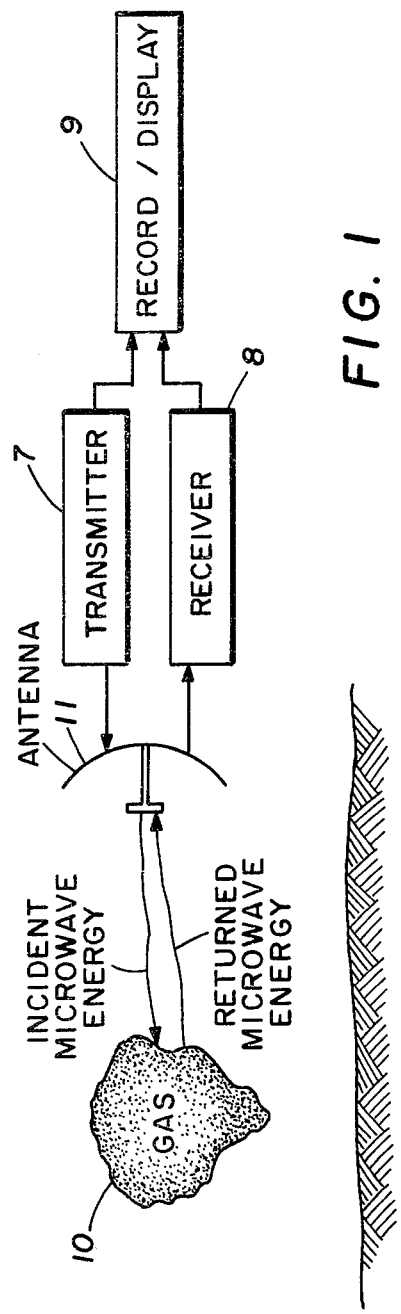
FIGS. 1 and 2 illustrate a radar system for use in the remote sensing of gas in the earth's atmosphere.

FIG. 1 illustrates a microwave radar system employed in the remote sensing of a gas in the atmosphere. A radar transmitter 7 and antenna 11 operate to emit a short, intense pulse of microwave energy in a concentrated beam. When a gas, such as from the subsurface gas seep 10, is located within the path of this transmitted beam of microwave energy above the earth's surface, the microwave pulse delivers a fraction of its energy to those molecules of the gas that can absorb such energy. After the microwave energy irradiates these absorbing molecules, they immediately begin emitting some of the absorbed energy. The frequency of the emitted energy is equal to the difference in rotational rates that were initially affected, regardless of the incident excitational frequency. This effect permits the exciting or pumping of the molecules with the radar transmitter 7 at a frequency somewhat removed from the molecular resonance frequency. The pumping frequency may be greater than or less than the molecular resonance frequency. In the particular system of the preferred embodiment described herein, the difference between the pumping and molecular resonance frequencies may be as much as 100 MHZ before system performance is adversely affected. One portion of the radar receiver 8 is tuned to the frequency of this energy emitted by the excited gas, thereby permitting the remote sensing of the gas seep without primary frequency interference from the microwave energy from the transmitter 7.

Figure 2:
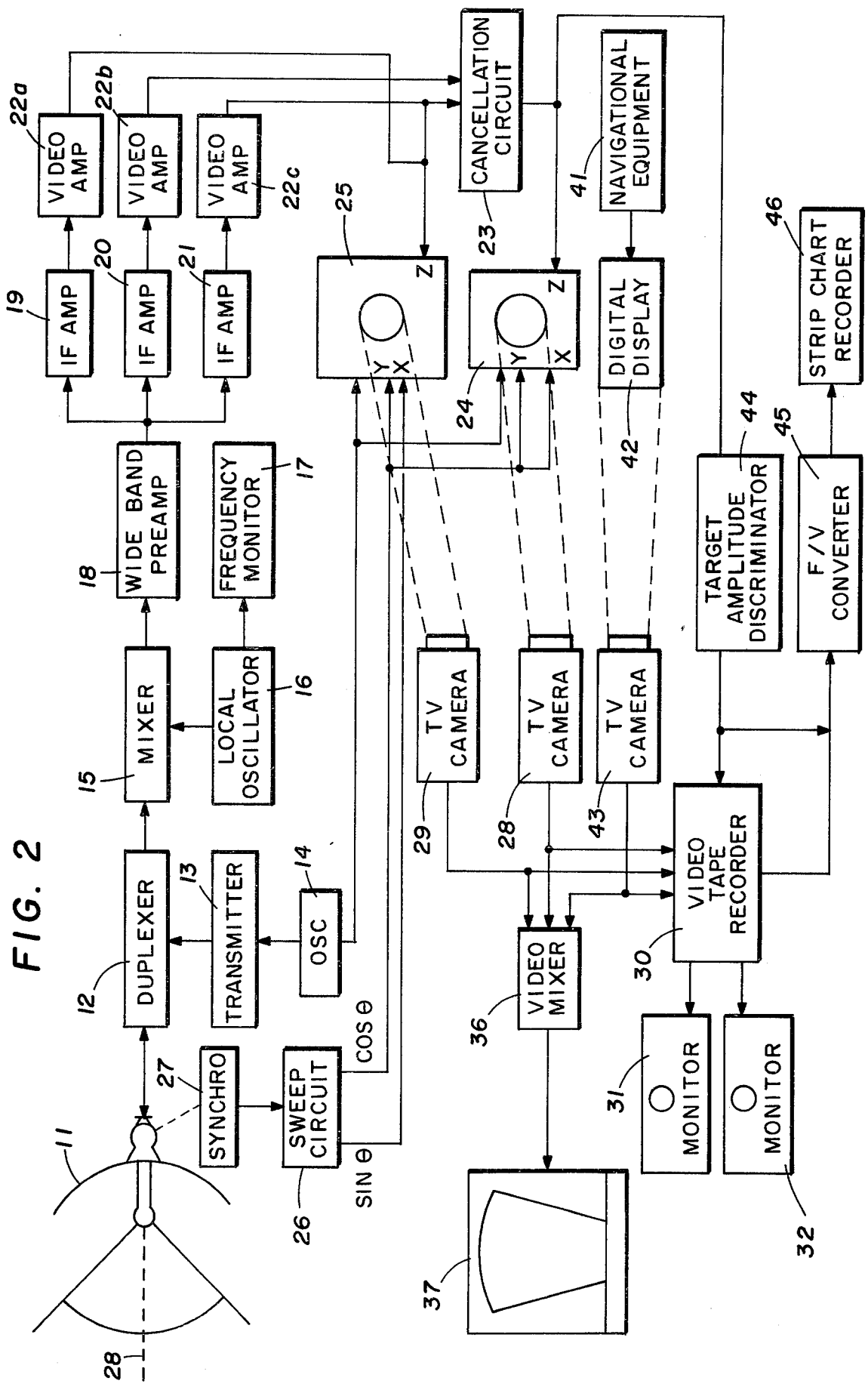

Such tuned receiver, illustrated in FIG. 2, produces video signals representing each gas seep detected during each sweep of the radar antenna. In accordance with the present invention, the amplitudes of these video signals are measured as an indication of gas concentration in the gas seeps, and the number of video signals are counted as an indication of the size of the gas seeps. This aspect of the invention is carried out by way of the video tape recorder 30, target amplitude discriminator 44, F/V converter 45, and strip chart recorder 46. However, before describing the operation of these units in carrying out the present invention of measuring the amplitudes and number of video signals representing gas seeps, the over-all operation of the tuned receiver will first be made in conjunction with FIG. 2.

TUNED RECEIVER

Referring to FIG. 2, the antenna 11 is of the sector scanning type mounted in the nose of commercial aircraft for weather radar. In an actual embodiment of the invention, the radar rotates through an arc of 120°, 60° on either side of the path of the aircraft. A cam arrangement rotates the antenna through its complete arc in two seconds and then reverses the movement so that the antenna is returned over the same arch in two seconds. Alternatively, a phased array antenna could be used.

The duplexer 12 and transmitter 13 are conventional radar components which produce a microwave pulse having a width between 0.25 and 2.5 microseconds, a pulse repetition rate about 1,000 per second and a peak power of 80 KW. The transmitter is triggered by oscillator 14. The transmitter frequency is approximately 20 MHZ above or below the characteristic frequency of molecular resonance of the gas undergoing exploration. In one embodiment of the invention, the transmitter includes a magnetron mechanically tunable from 8600 MHZ to 9600 MHZ and which is nominally tuned to 9375 MHZ. This is 20 MHZ above the observed reradiated signal from propane which has a frequency of 9355 MHZ.

The duplexer 12 alternately applies transmitter power to the antenna 11 and then applies the signal detected by the antenna to the receiver. The receiver includes a mixer 15.

The received microwave signal is applied from the antenna to the mixer 15 as is the signal from local oscillator 16. The local oscillator is tuned several megahertz away from one of the resonance frequencies of the gas to be identified. For example, the local oscillator is tuned to 9317 MHZ, 38 MHZ away from the reradiation frequency of propane. Preferably, mixer 15 is a nonlinear, balanced mixer which reduces local oscillator noise. Mixer 15 beats the local oscillator signal with the received signal to produce sum and difference signals. If the particular species of gas undergoing exploration is present in the atmosphere, a difference signal having a 38-MHZ component is produced at the output of the mixer.

A frequency monitor 17 provides a display of local oscillator frequency accurate to plus or minus 0.1 MHZ. It is important that the local oscillator 16 be tuned accurately. If the local oscillator drifts in frequency, the system will not detect the gas under exploration, for example, the reradiation of propane near 9355 MHZ.

The difference signal from the mixer 15 is amplified by the wide band-pass preamplifier 18 having, for example, a band width of 100 MHZ centered about 60 MHZ. The output of preamplifier 18 is applied to three I.F. amplifiers 19, 20, and 21. I.F. amplifiers 20 and 21 are tuned, for example, to 38 MHZ and 58 MHZ respectively. That is, I.F. amplifier 20 amplifies signals 38 MHZ below and above the tuned frequency of local oscillator 16. I.F. amplifier 20 produces an output having both the reradiated component, if it is present, and the background component of the received signal. I.F. amplifier 21 passes a signal having a component with frequencies 58 MHZ above or below the tuned frequency of oscillator 16. This component represents background energy.

The outputs of video amplifiers 20 and 21 are respectively applied to video amplifiers 22b and 22c, the outputs of which are applied to the cancellation circuit 23. Briefly, the cancellation circuit 23 substracts the 58-MHZ background energy component from the 38-MHZ reradiated energy component. The output of the cancellation circuit 23 represents only the reradiated energy component. This signal is applied to modulate the intensity of the sweep of the plan position indicator 24. In order to generate a signal representing hard targets, the I.F. amplifier 19 is tuned so that the transmitter frequency is received. The output of I.F. amplifier 19 is applied to video amplifier 22a. The component representing energy reflected from hard targets is applied to the plan position indicator 25.

Sweep signals for plan position indicators 24 and 25 are produced by oscillator 14 and sweep circuit 26. Each time the transmitter 13 is fired, a pulse from oscillator 14 starts the sweep of plan position indicators 24 and 25. Each sweep on the indicator originates at the bottom center of the screen and proceeds upward and outward in a direction coinciding with the direction of the antenna. Radial distance from the bottom center represents time and/or range, and the sweep is intensity modulated to represent signals received along this range.

As the antenna 11 mechanically moves through its 120° arc, a synchro 27 produces a signal representing the position of the antenna. Specifically, synchro 27 produces a signal representing the angle $\theta$ between the direction of the antenna and the nominal aircraft heading denoted by the dashed line 28. This signal from the synchro 27 is applied to sweep circuit 26 which generates two signals representing the $\sin\theta$ and $\cos\theta$. The $\sin\theta$ and $\cos\theta$ signals are respectively applied to the X and Y sweep inputs of the indicators 24 and 25.

Figure 3:
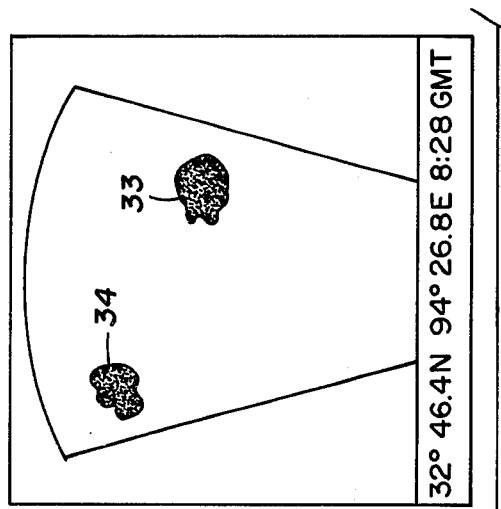
FIG. 3 depicts side-by-side displays of topographic features and hydrocarbon gas seeps.
Figure 3:
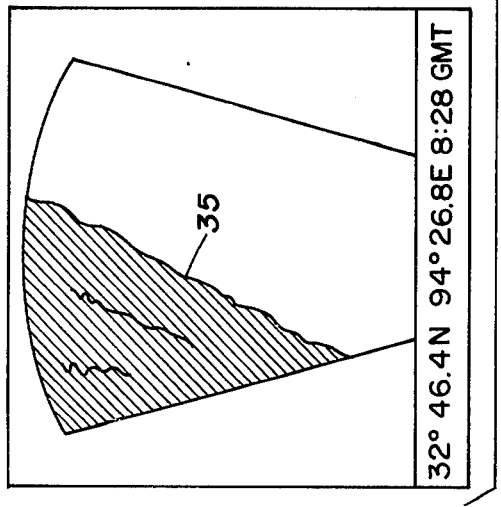

As a result, the indicators produce a pie-shaped display on the screen representing topographic features and gas seeps in 60° sectors on either side of the heading of the aircraft. FIG. 3 depicts such displays, with the left-hand display depicting topographic features as detected by reflections from hard targets, while the right-hand display depicts reradiated energy produced, for example, by propane seeps.

Conventional television cameras 28 and 29 are used to record the displays produced by indicators 24 and 25. The output of each camera is recorded on a video tape recorder, or recorders, 30. The output can be viewed in real time on the monitors 31 and 32 or can be replayed later on these monitors. Monitors 31 and 32 produce displays of the type shown in FIG. 3 wherein the topographic features and the gas seeps are displayed side-by-side. An interpreter can easily locate the gas seeps with respect to known topographic features. In FIG. 3, two gas seeps are indicated by the displays 33 and 34 of reradiated signals. The display on the left-hand side indicates topographic features, for example, a coastline 35.

As an alternative or as an additional refinement, the display of the hydrocarbon seeps may be superimposed on the display of the topographic features by using color television cameras and different color phosphors in the displays 24 and 25. For example, the display 24 can have a red-emitting phosphor, and the display 25 can have a green-emitting phosphor. Color television cameras 28 and 29 produce video signals representing these two displays, and the signals are mixed in the video mixer 36. Video mixer 36 can be a common commercial unit for superimposing two or more video pictures. One example of such a mixer is the Sony special-effects video recorder. Alternatively, the primary display can be in black and white, and false color can be employed in color cameras instead of different phosphors.

Figure 4:
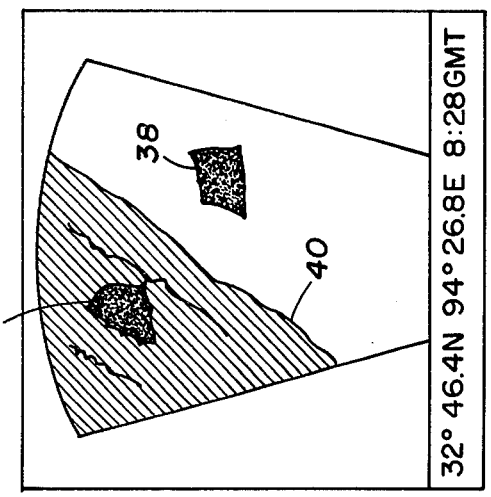
FIG. 4 depicts a display of hydrocarbon gas seeps superimposed upon a display of topographic features.

When the superimposed displays are reproduced on the color monitor 27, a display of the type depicted in FIG. 4 is produced. In this case, the gas seeps are represented in red as indicated at 38 and 39, whereas the topographic features such as the coastline 40 are displayed in green.

Video mixer 36 can also be usefully employed to display navigational data concurrently with the gas seep display. Conventional aircraft navigational equipment 41 controls a digital display 42 which provides a readout of latitude, longitude, and time. Television camera 43 records this display. Mixer 36 superimposes the navigational data on the bottom of the display as is shown in FIGS. 2 and 3.

Having described the over-all operation of the radar receiver of FIG. 2 and the production of such receiver of video signals representing gas seeps detected during each sweep of the radar, the present invention of measuring the amplitudes of these video signals as an indication of gas concentration in the seeps and counting the number of video signals as an indication of the size of the gas seeps will now be described in detail.

AMPLITUDE AND NUMBER DETECTION

Figure 5:
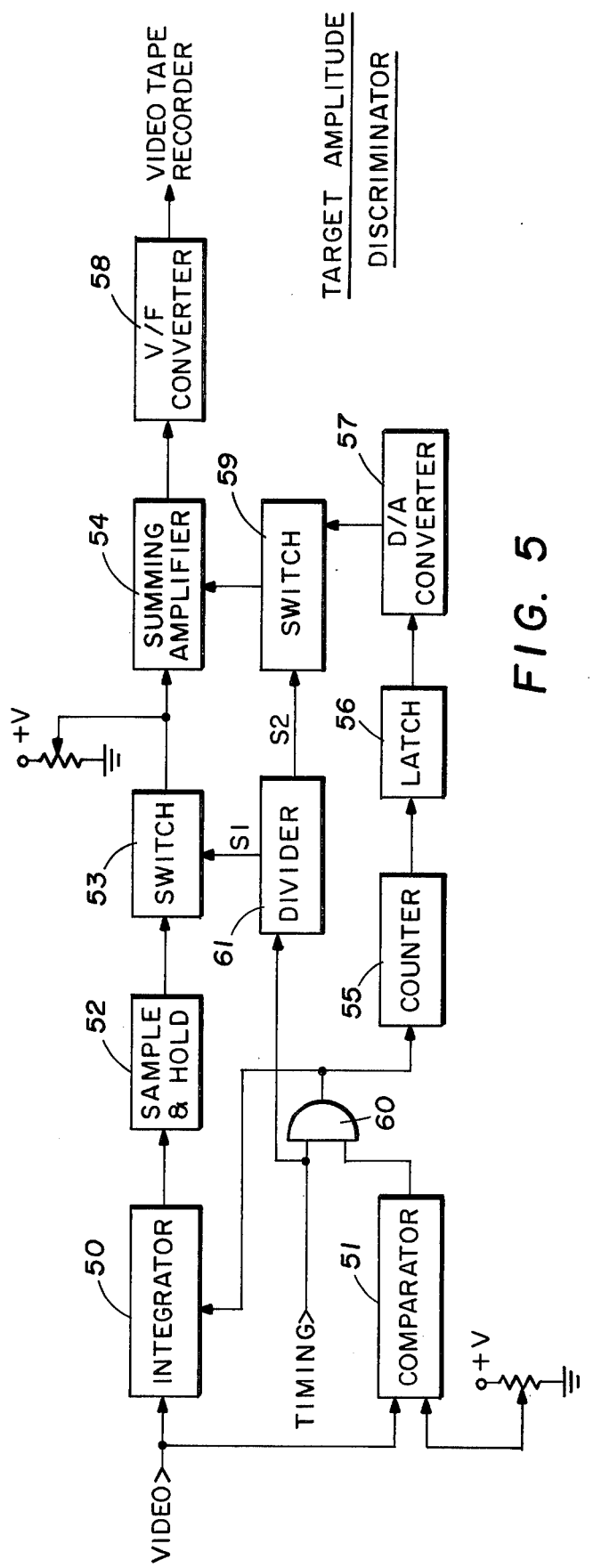
FIG. 5 is a schematic diagram of the target amplitude discriminator portion of the system of FIG. 1.

During each sweep of the radar, the video signals from the cancellation circuit 23 of FIG. 2 and representing gas seeps are applied to the target amplitude discriminator 44. This target amplitude discriminator measures the amplitudes of the video signals representing the gas seeps during each radar sweep as an indication of gas concentration in the seeps and counts the number of video signals representing gas seeps during each radar sweep as an indication of the size of the seeps. Details of the target amplitude discriminator 44 are illustrated in FIG. 5. Each such video signal is applied to the integrator 50 and the comparator 51. The integrator 50 is gated by timing pulses applied to gate 60, for example, 819 per radar sweep. When so gated, the integrator 50 measures the average amplitude of all the video signals occurring during each sweep of the radar, provided that each such video signal exceeds a preset threshold level determined by a reference signal applied also to the comparator 51. Such reference may, for example, be about 0.5 volt. A sample and hold circuit 52 samples the output of integrator 50 and applies it through the switch 53 as a seep amplitude signal to the input of a multiplexer and summing amplifier 54.

The gated pulses to the integrator 50 also provide a clock for a binary counter 55. This counter is a 12-bit counter providing an output indicative of the number of video signals exceeding the threshold level during each radar sweep. This output is stored in the latch 56 and then applied to the digital-to-analog converter 57. The output of the converter 57 is applied through the switch 59, as a seep number signal, to the multiplexer and summing amplifier 54.

The multiplexer and summing amplifier 54 is offset by a positive voltage source, +5.0 volts for example, such that its output is at +5.0 volts when there are no gas seeps present to cause video signals to be applied to the integrator 50. When gas seeps are present, however, the seep amplitude signal from the sample and hold circuit 52 and the seep number signal from the D/A converter 57 are alternately applied to amplifier 54 by way of switches 53 and 59 respectively. A seep amplitude signal will cause the +5.0 volt output of amplifier 54 to go in a positive direction, while a seep number signal will cause the +5.0 volt output of amplifier 54 to go in a negative direction.

Following each radar sweep, the seep amplitude and seep number signals are alternately applied for equal time periods to amplifier 54 through the alternate activations of switches 53 and 59. These switches are alternately operated for equal time intervals by means of the divider 61 which operates to divide the 819 timing pulses per radar sweep into two separate pulses 51 and 52. During each of these time periods, in the order of one second each for example, the output of amplifier 54 is converted to a frequency-modulated signal by the voltage-to-frequency converter 58. During the seep amplitude period, this frequency-modulated signal is in the order of 5 to 10 kilohertz, for example. During the seep number period, this frequency-modulated signal is in the order of 0 to 5 kilohertz, for example. These outputs from the converter 58 are recorded on the audio channel of the video tape recorder 30 of FIG. 2 in real time following each radar sweep during the gas seep survey. Such outputs can also be recorded on the strip chart recorder 46 in real time by connecting the F/V converter 45 in parallel with the video tape recorder 30.

Figure 6:
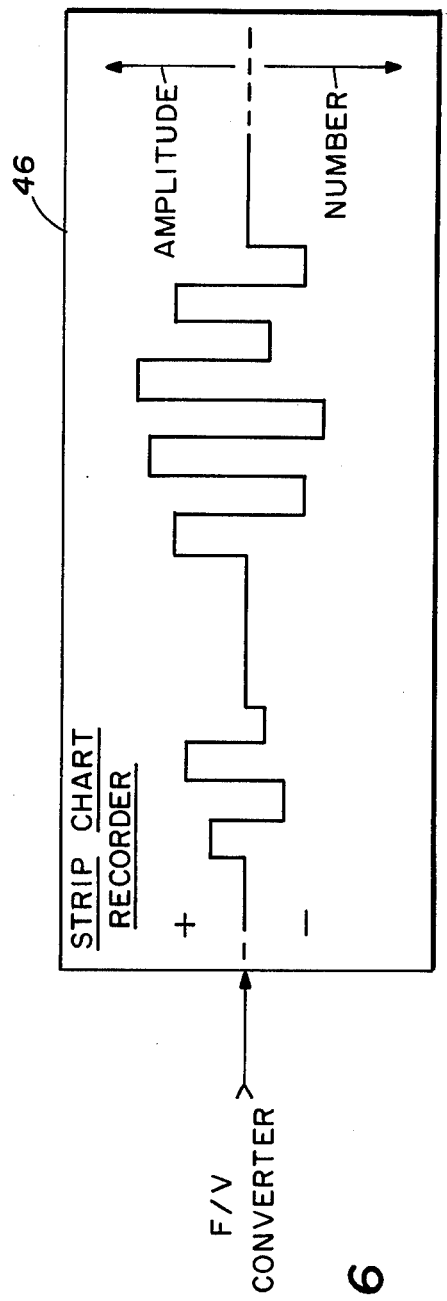
FIG. 6 depicts a display of the concentrations and sizes of hydrocarbon gas seeps.

After completion of the survey, the information stored on video tape and representing the concentrations and sizes of any gas seeps detected during the survey may be retrieved and recorded for visual presentation. The frequency-modulated data stored on video tape recorder 30 and representing the seep amplitude and seep number signals is converted to an amplitude-modulated signal by the frequency-to-voltage converter 45. The amplitude-modulated signal drives the recording pen of a strip chart recorder 46 so as to produce a visual record as illustrated in FIG. 6.

While a particular embodiment of the invention has been shown and described, other modifications are within the true spirit and scope of the invention. The appended claims are, therefore, intended to cover all such modifications. In accordance with one specific system that has been successfully built and operated, the following TABLE sets forth specific types of circuit components for the target amplitude discriminator 44 and the F/V converter 45 of the present invention.

TABLE

| Reference Designation | Description |
|---|---|
| Integrator 50 | NE536T (Signetics) |
| Comparator 51 | µA710 (Fairchild) |
| Sample and Hold 52 | NE536T (Signetics) |
| Switchs 53 and 59 | CD4066AE (R.C.A.) |
| Amp 54 | µA741 (Fairchild) |
| Counter 55 | CD4040AE (R.C.A) |

TABLE-continued

| Reference Designation | Description |
|---|---|
| Latch 56 | CD4042AE (R.C.A.) |
| D/A converter 57 | AD75216N (Analog Devices) |
| V/F converter 58 | CD4701AE (R.C.A.) |
| F/V converter 45 | CD4702AE (R.C.A.) |
| +V | +10VDC |

We claim:

1. A method for identifying gas seeps in the atmosphere, comprising the steps of:
   (a) repetitively transmitting microwave energy pulses of a first frequency into the atmosphere through a given radiation pattern, each microwave energy pulse that irradiates a gas seep located within said radiation pattern excites said gas seep to emit a microwave energy pulse at a second frequency characteristic of a molecular resonance of the particular species of gas,
   (b) receiving microwave energy pulses at said second frequency emitted by gas seeps located within said radiation pattern,
   (c) producing a video signal for each of said received microwave energy pulses,
   (d) determining the average amplitude of all of said video signals received from gas seeps located within said radiation pattern,
   (e) determining a count of the number of said video signals received from gas seeps located within said radiation pattern, and
   (f) recording the determinations of said average amplitude and said count as indications of the concentration and size of the gas seeps located within said radiation pattern.

2. The method of claim 1 wherein said step of determining the average amplitude of said video signals comprises the steps of:
   (a) establishing a threshold level, and
   (b) integrating all the video signals exceeding said threshold level over the given radiation pattern.

3. The method of claim 1 wherein said step of determining a count of the number of video signals comprises the steps of: p1 (a) establishing a threshold level, and
   (b) accumulating a count of the number of video signals whose amplitudes exceed said threshold level over the given radiation pattern.

4. In a microwave radar system for identifying gas seeps in the atmosphere, comprising:
   (a) a transmitter for producing repetitive microwave energy pulses at a first frequency,
   (b) a rotatable antenna coupled to said transmitter and repetitively swept through a given radiation pattern to transmit said repetitive microwave energy pulses at said first frequency into the atmosphere during each antenna sweep, each transmitted microwave energy pulse that irradiates a gas seep located within the radiation pattern of said antenna sweep excites said gas seep to emit a microwave energy pulse at a second frequency characteristic of a molecular resonance of the particular species of gas, and
   (c) a receiver coupled to said antenna and tuned to produce a video signal in response to each microwave energy pulse returned to said antenna at said second frequency, the improvement comprising:
      (i) means for producing a first signal representative of the average amplitude of all the video signals produced by said receiver during each antenna sweep,
      (ii) means for producing a second signal representative of the number of video signals produced by said receiver during each antenna sweep, and
      (iii) means for recording said first and second signals as indications of the concentration and size of the gas seeps located within said radiation pattern.

5. The system of claim 4 wherein said means for producing said first signal comprises:
   (a) a comparator for producing a pulse in response to each video signal that exceeds a preset threshold level, and
   (b) an integrator gated by said pulse to integrate those video signals that exceed said preset threshold level for each antenna sweep.

6. The system of claim 4 wherein said means for producing said second signal comprises:
   (a) a comparator for producing a pulse in response to each video signal that exceeds a preset threshold level, and
   (b) a counter which accumulates a total count of the number of pulses produced by said comparator for each antenna sweep.

7. The system of claim 6 further including a digital-to-analog converter for converting the output of said counter to an analog representation.

8. The system of claim 4 wherein said recording means includes:
   (a) means for alternately recording said first and second signals in opposite polarities for each antenna sweep, and
   (b) means for producing a continuous recording of said first and second signals for a plurality of antenna sweeps.

9. The system of claim 4 wherein said recording means comprises:
   (a) a voltage-to-frequency converter,
   (b) means for alternately applying said first and second signals to said converter, and
   (c) a video tape recorder for recording the frequency-modulated output of said converter as a representation of the concentration and sizes of gas seeps located within the radiation pattern of said antenna.

10. The system of claim 9 further including:
    (a) a frequency-to-voltage converter coupled to said video tape recorder for converting the output of said video tape recorder to an amplitude-modulated signal in which said first and second signals are represented by opposite polarities, and
    (b) a strip chart recorder for alternately recording said first and second signals, the recording pen of said recorder being driven in accordance with the polarity of said amplitude-modulated signal.

* * * * *

UNITED STATES PATENT AND TRADEMARK OFFICE
CERTIFICATE OF CORRECTION

PATENT NO. : 4,132,943

DATED : January 2, 1979

INVENTOR(S) : Luke S. Gournay, John W. Harrell and Charles L. Dennis

It is certified that error appears in the above-identified patent and that said Letters Patent are hereby corrected as shown below:

Abstract or Title page, Assignee should be --Mobil Oil Corporation--.
Abstract or Title page, Under "Abstract", line 1, "microwve" should be --microwave--.
Abstract or Title page, Under "Abstract", line 12, "seep" should be --sweep--.
Column 3, line 25, "arch" should be --arc--.
Column 7, line 44, delete "pl" before "(a)".

Signed and Sealed this

Twenty-fourth Day of April 1979

[SEAL]

Attest:

RUTH C. MASON
Attesting Officer

DONALD W. BANNER
Commissioner of Patents and Trademarks